US006753492B1

(12) United States Patent
Cleaveland

(10) Patent No.: US 6,753,492 B1

(45) Date of Patent: Jun. 22, 2004

(54) ARC EXTINGUISHING DEVICE WITH A METAL MATRIX COMPOSITE HIGH SPEED WHIP

(75) Inventor: Charles M. Cleaveland, North Huntingdon, PA (US)

(73) Assignee: Cleaveland/Price Inc., Trafford, PA (US)

( * ) Notice: Subject to any disclaimer, the term of this patent is extended or adjusted under 35 U.S.C. 154(b) by 0 days.

(21) Appl. No.: 10/431,700

(22) Filed: May 8, 2003

(51) Int. Cl.[7] .................................................. H01M 9/38

(52) U.S. Cl. ............................................ 218/18; 218/14

(58) Field of Search ............................ 218/18, 14, 2–8, 218/12, 78, 84, 153, 154, 43, 67, 71

(56) References Cited

U.S. PATENT DOCUMENTS

| | | | | |
|---|---|---|---|---|
| 3,217,115 A | | 11/1965 | Kaplan | |
| 3,938,964 A | * | 2/1976 | Schmidt | 138/143 |
| 3,955,303 A | * | 5/1976 | Outlaw et al. | 43/19.2 |
| 4,243,854 A | | 1/1981 | Pahl | |
| 5,079,099 A | * | 1/1992 | Prewo et al. | 428/552 |
| 5,359,167 A | | 10/1994 | Demissy et al. | |
| 5,369,234 A | * | 11/1994 | Demissy | 218/14 |
| 5,746,267 A | * | 5/1998 | Yun et al. | 164/65 |
| 6,392,181 B1 | | 5/2002 | Cleaveland et al. | |

FOREIGN PATENT DOCUMENTS

| | | |
|---|---|---|
| CA | 2357453 | 5/2002 |

OTHER PUBLICATIONS

Hunt et al., “Automotive Applications of Metal–Matrix Composites”, pp. 1029–1032, (no date).

Sain, “Engineering Composites”, pp. 1–20, www.unb.ca/web/P&P Centre/engcomp/engcomp.htm, (no date).

3M Innovation, “3M Composite Conductors”, 2 pp, Copyright 2000, (no month).

3M, “Metal Matrix Composites–continuous Wire”, 2 pp., Copyright 1995–2000, www.3M,com/market/industrial/mmc/continuous wire.htm, (no month).

U.S. patent application Ser. No. 10/342,035, Kowalik et al., filed Jan. 14, 2003.

* cited by examiner

*Primary Examiner*—Lincoln Donovan
*Assistant Examiner*—M. Fishman
(74) *Attorney, Agent, or Firm*—Gordon H. Telfer

(57) ABSTRACT

Rapid arc extinguishing devices for air break switches have a whip with at least an end portion of a metal matrix composite (MMC) material. The MMC whip is applied in embodiments similar to those of prior disclosed fiber reinforced plastic (FRP) whips without need for application of another conductor on the surface for conductivity from end to end.

18 Claims, 1 Drawing Sheet

ARC EXTINGUISHING DEVICE WITH A METAL MATRIX COMPOSITE HIGH SPEED WHIP

BACKGROUND OF THE INVENTION

1. Field of the Invention

This invention relates to arc extinguishing devices for electrical switchgear such as air break disconnect switches used in transmission and distribution lines.

2. Related Art

Arc extinguishing devices that include an all-metal whip element are known to the prior art for the purpose of helping minimize arcing upon switch opening.

More recently, disclosure has been made in U.S. Pat. No. 6,392,181, issued May 21, 2002, and in copending application Ser. No. 10/342,035, filed Jan. 14, 2003, by the present inventor and others, both of which are assigned to the present assignee, of arc extinguishing devices including a whip element comprising a nonmetal, such as a fiber reinforced plastic (FRP) material, with a conductive path of various forms on its surface.

All of the description of prior art all metal whips and the more recently disclosed whips including a nonmetal of the above-mentioned patent and copending application is incorporated herein by reference.

In the materials art, there is a class of materials referred to as metal matrix composites (or MMCs) that have been long known and have been applied to and/or are of interest for structures in automotive and other applications. Such composite materials and prior known intended uses are described, for example, in an article by Hunt et al., "Automotive Applications of Metal-Matrix Composites", pp. 1029–1032; and an article by Sain, "Engineering Composites", pp. 1–20, at www.unb.calweb/p&p centre/engcomp/engcomp.htm.

SUMMARY OF THE INVENTION

The present invention is directed to arc extinguishing devices with a whip that comprises (at least a tip portion that flexes in contact with a latch of the device and is last to separate and spring away from the latch) a metal matrix composite (MMC), which is a term embracing composite members of a metal matrix containing reinforcing fibers, such as, but not limited to, alumina fiber reinforced aluminum (sometimes referred to as FRA) as described in the aforementioned publications, which are incorporated by reference herein for their description of practices with such materials.

Other features and characteristics of arc extinguishing devices of the present invention may, singly or in various combinations, be in accordance with or similar to those of the above copending application including, for example, the combination in a whip of an MMC rod with an all-metal base rod that is first to engage the latch of the device upon switch opening and switch closing; an MMC rod that is a tapered tube and, in a further embodiment, has another MMC rod disposed within it; and having a wheel on the latch with which the MMC rod makes sliding conductive contact during switch opening.

The invention offers alternatives to whips that are all uniform metal throughout (referred to as "all-metal") and also to whips that comprise fiber reinforced plastic. MMC materials have high specific strength (strength in relation to density). While some known MMC materials are characterized by high hoop strength, because that is favorable for the structures previously intended, the strength can be subject to the orientation of the reinforcing fibers, e.g., by having the fibers run lengthwise through an MMC whip rod, rather than laterally or circumferentially, greater bending strength can result. Further, an MMC whip element does not necessitate a conductor to be applied to it for adequate conduction over the entire whip length, as is generally the case with FRP whips. However, an MMC whip may have a further conductor on it if desired for any propose purpose, such as a brazing alloy, if one is used to consolidate MMC sheets or tapes into a desired rod configuration, or a more durable metal part to enhance arc resistance.

Consequently, embodiments of the invention are believed attractive in facilitating achievement of high speed separation for rapid arc extinguishing, relative to all-metal whips, and avoiding the need for an applied conductor for sliding engagement with a latch as generally is needed with FRP whips. Regardless of the reasons for adopting the inventive apparatus, it provides the art with further alternatives not previously known.

DETAILED DESCRIPTION OF THE INVENTION

Figure 1:
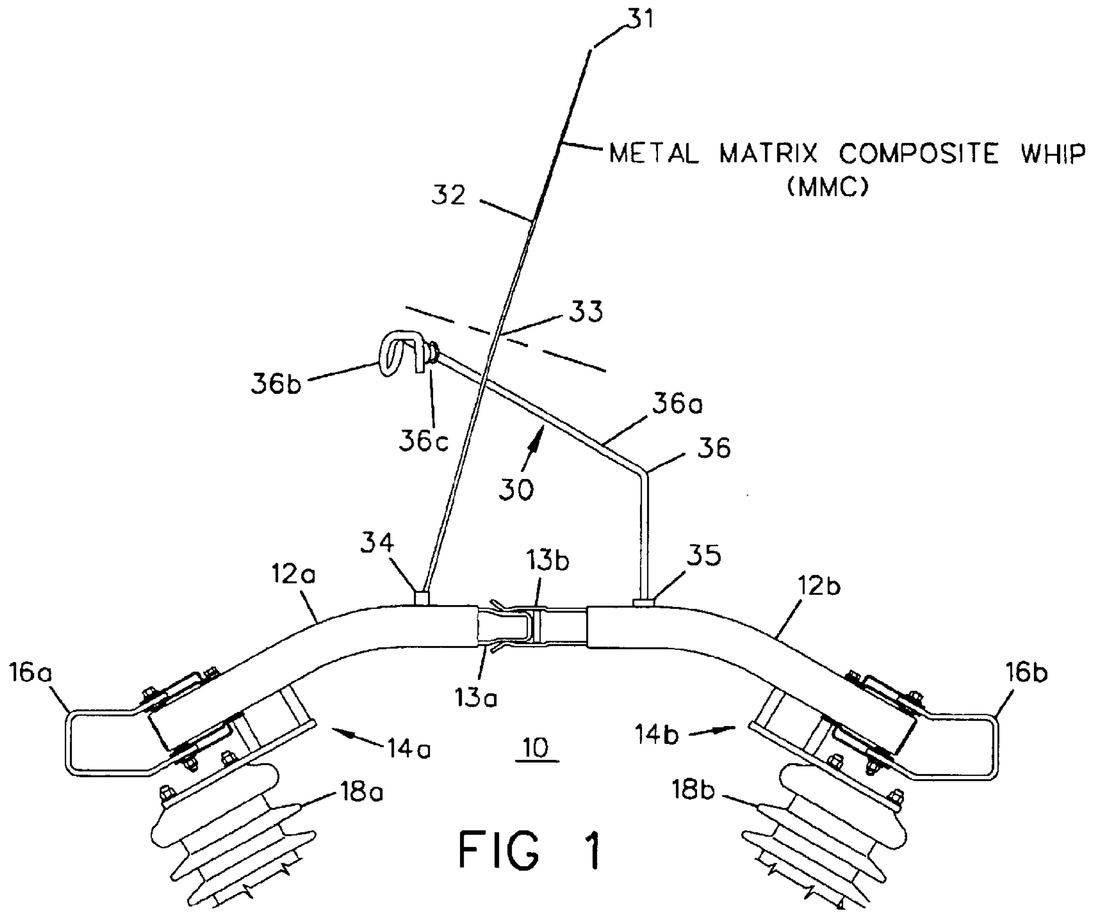
FIG. 1 is a front elevation view, partly broken away, of a switch with a high speed whip type of arc extinguishing device.

FIG. 1 shows a generally known type of air break switch 10 incorporating a form of the present invention. The switch 10 is a "center break" switch shown in its closed position. The elements include:

a pair of movable switch arms 12*a* and 12*b* (in general, switches in accordance with the invention have switch arms of which at least one is movable);

contacts 13*a* and 13*b* on the respective arms 12*a* and 12*b* (in this example, contact 13*a* fits within jaw-like contact 13*b*);

pivotal or hinge-like arm supports 14*a* and 14*b* for the respective arms;

line terminals 16*a* and 16*b* respectively conductively connected to the switch arms 12*a* and 12*b* near the arm supports 14*a* and 14*b;* insulators 18*a* and 18*b* respectively supporting each half of the switch 10; and a switch operating mechanism (not shown) that is arranged at the lower end of the insulator supports 18*a* and 18*b* to produce rotational motion of the insulators 18*a* and 18*b* and the supported arms and contacts.

In addition, this example switch includes an arc extinguishing device 30 with similarities to those previously described but also with a significant inventive modification. The device 30 includes a whip 32 and, in this example, an attachment (e.g., a clamp) 34 fastening the whip 32 at its lower end to the arm 12*a*. The device 30 also includes a latch (or hook) 36 conductively joined by a latch attachment 35 with the arm 12*b*. In this example, the latch 36, which is all conductive, includes a rod 36*a* with a loop portion 36*b* at its free end and, just prior to the loop 36*b,* a small wheel 36*c* rotatable about a pin secured to the rod 36*a*.

In contrast to previously known whips, the whip 32 comprises a metal matrix composite (MMC). In one example, the entire whip 32 from the attachment 34 to the free or tip end 31 includes an MMC material. In another form, the whip includes MMC from an intermediate division 33 out to the tip end 31 with an all-metal portion from the division 33 to the attachment 34.

In the latter described example, and as shown, the division occurs above the point at which the whip 32 is most proximate the latch 36 when closed. Therefore, initial contact on opening of the switch and, also, upon closing of the switch occurs between the all-metal whip portion and the latch. That contact also normally occurs in the closed switch position.

The switch 10 opens with the whip 32 making sliding conductive engagement with the latch 36, with increased flexing, until the arms 12*a* and 12*b* have moved enough for the whip 32 to spring away from the latch. As further described in the copending application, a latch wheel 36*c* may optionally be included and arranged as the part of the latch 36 against which the whip slides and finally separates from.

The MMC whip 32 (or MMC portion of whip 32, where a base portion below division 33 is all-metal) has a metal matrix containing fibers, for reinforcement, of a composition differing from that of the metal matrix. For example, and without exclusion of others, the metal matrix can be selected from a group consisting essentially of titanium, titanium alloys, aluminum, and aluminum alloys. These are examples offering good low weight and high strength characteristics. The fibers within a selected metal matrix can, for example and without exclusion of others, be selected from a group consisting essentially of fibers of carbon, KEVLAR (trademark for some known compositions of man-made fibers for generalized use in the industrial arts), and alumina, either singly or in mixtures of the mentioned fibers.

An MMC material that has had substantial development and may be one of the most readily available is one with a metal matrix of aluminum and fibers of alumina.

In general, the MMC rod of whip 32 can be tapered or not tapered. Presently, a tapered rod is preferred for greater speed. Also, in general the MMC rod can be solid or tubular, with the latter presently preferred for greater speed. These preferences are believed to enhance arc extinguishing characteristics of the device 30 but it is recognized that the form of readily available and economically manufacturable MMCs can influence the design and the alternatives are not excluded.

The cross-sectional configuration of the MMC rod can be various; circular is a convenient choice in most cases.

The known MMC art can be applied to manufacture the MMC rod of whip 32, preferably, but not necessarily, with some modification to achieve preferred spring qualities. In the whip rod 32 its length and tapering may be enough to achieve a desired spring force for high speed separation. Where maximum strength and spring force is desired, techniques of MMC manufacture may include orientation of the reinforcing fibers so they run substantially longitudinally within the metal matrix in the direction of the length of the rod. This is a known practice for making strong articles of fiber reinforced plastic (FRP) materials with spring characteristics, such as fishing rods, which can be applied to whips of FRP. Techniques for MMC fabrication can, in general, be similar to those for fiber reinforced plastics.

MMC members are sometimes fabricated using a brazing alloy after individual layers (tapes or sheets) of MMC material have been assembled in the desired form to consolidate the layers into a permanent structure. That is a technique that may be used for the MMC whip in which the brazing alloy may remain on the MMC surface. However, where the MMC is formed without brazing, such as by casting, there is generally no necessity to apply a conductor to the MMC surface for the sake of conductivity, as is usually needed on an FRP whip, as the MMC material is substantially conductive on and through the metal matrix; so the additional weight of an applied conductive layer can be avoided. If one desires for any reason (e.g., even greater conductivity or greater arc durability than the MMC material provides) techniques such as described in the above patent and copending application can be used on the MMC whip, continuously along the whip or just where arcing is likely to be most severe.

Figure 2:
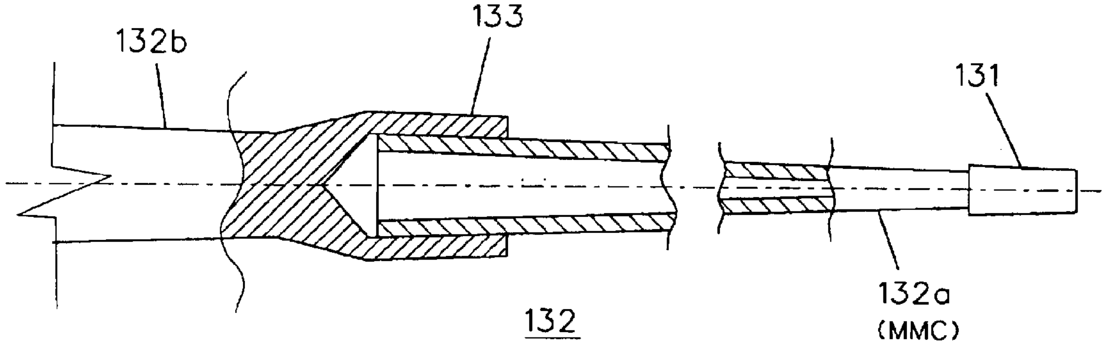
FIG. 2 is a side elevation view, partly in section and partly broken away, of one embodiment of a whip for an arc extinguishing device such as that of FIG. 1.

Referring to FIG. 2, a more particular example of an MMC whip 132 is shown. In this example, the whip 132 is in two parts secured together at a securement or coupling 133 with a tip part 132*a* of MMC and a base part 132*b* of all-metal, as generally described in connection with FIG. 1. Also, the example is one with tapering of both parts 132*a* and 132*b* and the MMC part 132*a* being in the form of a tube.

Similar to FRP whips as described in the above application, the blunt base portion of the MMC tube 132*a* can have within it additional material such as by inserting an additional (one or more) piece of MMC tapered rod or tube (not shown in the drawing).

The securement 133 of the MMC part 132*a* with the all-metal part 132*b* in this example is similar to a way of securing two part whips in the copending application. The end of the all-metal whip part 132*b* has an axial bore or socket into which the blunt end of the whip part 132*a* is inserted. Bonding with an adhesive, preferably conductive, is optional. The principal mechanical securement and achievement of conductive continuity is by the bore wall material of the all-metal part 132*b* being crimped into close contact with the surface of the MMC part 132*a*.

In this example, no additional conducive layer on most of the MMC part 132*a* is shown but there is a cap 131 at the extremity of part 132*a* This is an option to enhance durability of the tip of part 132*a* where arcing can occur upon separation of the whip from a latch, such as latch 36 of FIG. 1. The cap 131 may be variously shaped. For example, it can, but need not be, formed to extend beyond the tip of part 132*a* a deliberate distance greater than needed to cover the tip of part 132*a;* also, it can be tapered to a finer or less fine point. Conveniently, the cap 136 may be crimped onto the tip end of part 132*a*.

Without limitation, materials suitable for the all-metal part 132*b* include beryllium-copper, stainless steel, and others used in prior all-metal whips; materials suitable for the MMC part 132*a* include those previously described herein; and the cap 136, if used, is of a highly arc resistant, light weight, conductor.

By way of further example, a whip 132 as shown in FIG. 2 can consist essentially of an all-metal part 132*b* of stainless steel, an MMC tube 132*a* of alumina fiber reinforced aluminum (FRA), and a cap 131 of titanium.

The present invention and its related patent and copending application show a wide spectrum of design possibilities for a whip in a quick-break whip arc extinguishing device for an air break switch where the whip is, or includes, a flexible rod with a combination of metal and nonmetal material, such as an MMC rod or an FRP rod with an applied metal surface.

Variations and additional examples of the invention will be apparent from the foregoing description and the following claims.

What is claimed is:

1. An arc extinguishing device for use in combination with an air break switch, comprising:

a whip element and a latch element each secured to a respective conductive contact of a switch;

the whip element comprising a tip part of a metal matrix composite rod and a base part of an all-metal rod having an end conductively secured with an end of the metal matrix composite rod; and the whip and latch elements being arranged so that the all-metal rod of the whip element is first to engage the latch element upon switch opening and switch closing and the metal matrix composite rod of the whip element is last to separate and spring away from the latch element upon switch opening.

2. The device of claim 1 where:

the metal matrix composite rod comprises a metal matrix containing fibers of a composition differing from that of the metal matrix.

3. The device of claim 2 where:

the metal matrix is selected from a group consisting essentially of titanium, titanium alloys, aluminum, and aluminum alloys.

4. The device of claim 2 where:

the fibers are selected from a group consisting essentially of carbon fibers, KEVLAR fibers, alumina fibers, and mixtures thereof.

5. The device of claim 2 where:

the metal matrix composite consists essentially of fiber reinforced aluminum.

6. The device of claim 5 where:

the fiber reinforced aluminum includes fibers of alumina.

7. The device of claim 1 where:

the metal matrix composite rod is a tapered rod.

8. The device of claim 1 where:

the metal matrix composite rod is a tubular rod.

9. The device of claim 1 where:

the metal matrix composite rod is a tubular, tapered rod.

10. The device of claim 1 where:

the metal matrix composite rod consists essentially of a metal matrix containing reinforcing fibers extending substantially in the direction of the length of the rod.

11. The device of claim 9 further comprising:

at least one additional tapered rod disposed within the first mentioned rod.

12. The device of claim 1 further comprising:

consolidating brazing alloy on the metal matrix composite rod.

13. The device of claim 1 where:

the latch element comprises a conductive rod having a conductive wheel on a pin secured thereto.

14. An air break switch comprising:

a pair of main switch contacts each with a line terminal for connection with segments of an electrical line;

a switch operating mechanism for opening and closing the main switch contacts;

an arc extinguishing device including a whip element attached in electrical contact with one of the main switch contacts and a latch element attached in electrical contact with the other of the main switch contacts;

the whip element comprising, at least in a tip portion at the extremity away from the one contact a rod comprising a metal matrix composite;

the whip element further comprising an all-metal rod having an end conductively secured with an end of the metal matrix composite rod; and the latch and whip elements are arranged so that upon initial opening of the switch contacts the latch and the all-metal rod of the whip are in contact prior to sliding conductive engagement of the metal matrix composite rod with the latch after which the metal matrix composite rod springs away from the latch and, during a closing operation of the switch operating mechanism, the all-metal rod makes initial contact with the latch.

15. The switch of claim 14 where:

the whip comprising a metal matrix composite includes a metal matrix providing continuous electrical conductivity over the rod surface without additional material added for conductivity to the rod surface.

16. The switch of claim 14 where:

the latch element comprises a conductive rod having a conductive wheel rotatable about a pin secured to the conductive rod of the latch; and the whip and latch elements are further arranged so that sliding conductive engagement of the metal matrix composite rod with the latch wheel occurs during an opening operation of the switch operating mechanism with flexing of the metal matrix composite rod of the whip until separation of the whip from the latch wheel.

17. The switch of claim 14 where:

the all-metal rod has a socket at the end secured to the metal matrix composite rod with a wall crimped onto the end of the metal matrix composite rod; and the unsecured opposite end of the metal matrix composite rod has an all-metal tip crimped over it.

18. The switch of claim 17 where:

the all-metal rod consists essentially of stainless steel;

the metal matrix composite rod consists essentially of alumina fiber reinforced aluminum; and the all metal tip consists essentially of titanium.

* * * * *